Aug. 24, 1965   C. S. ARMISTEAD   3,201,842
MAGNETIC FASTENER
Filed Feb. 14, 1963
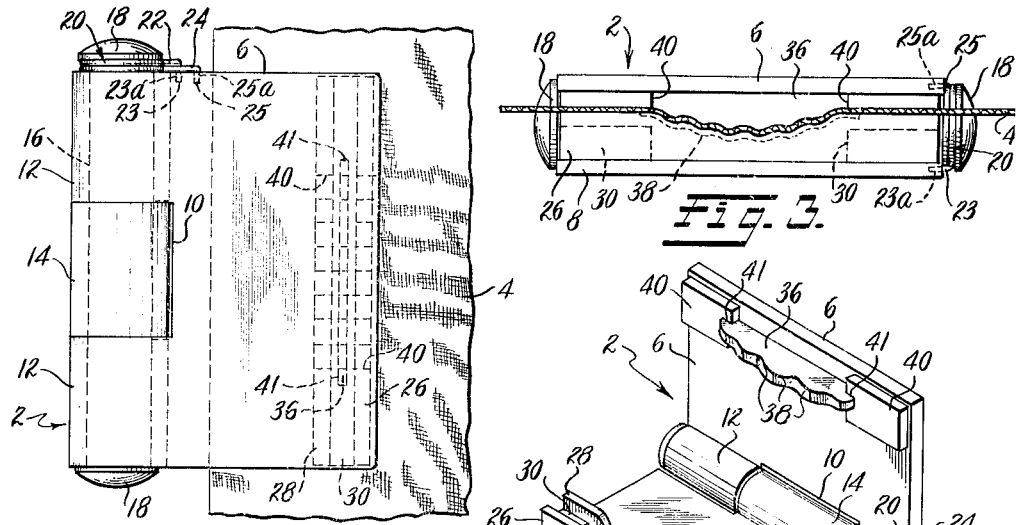
Fig. 1.
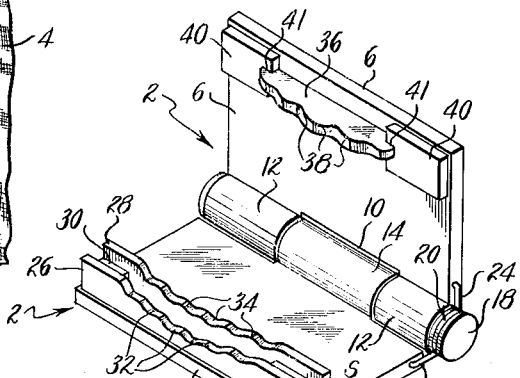
Fig. 3.
Fig. 4.
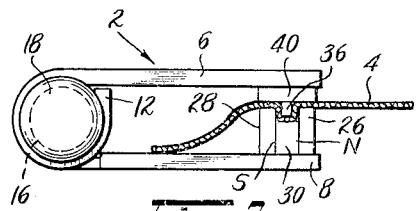
Fig. 2.
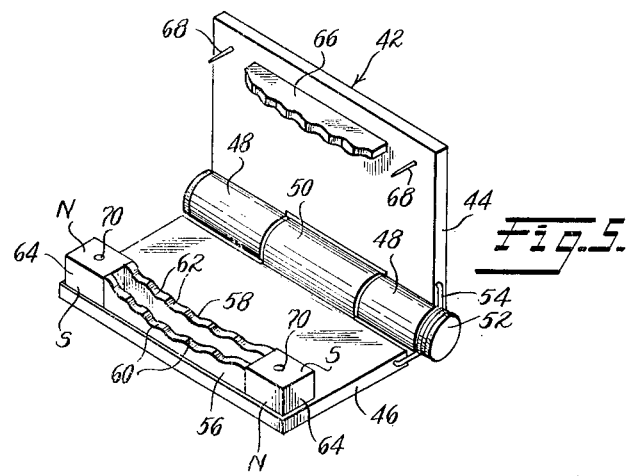
Fig. 5.
INVENTOR.
Charles S. Armistead
BY
Bacon & Thomas
ATTORNEYS

United States Patent Office 3,201,842
Patented Aug. 24, 1965

3,201,842
MAGNETIC FASTENER
Charles S. Armistead, Box 724, Morgantown, W. Va.
Filed Feb. 14, 1963, Ser. No. 258,481
13 Claims. (Cl. 24—248)

This invention relates generally to fasteners of the type utilized for holding cloth fabric, sheet material, and the like, and more particularly to an improved fastener employing of a novel arrangement of magnetic materials to provide clamping force.

The need very often arises for hanging, or holding in place, pieces of cloth fabric and other like flexible sheet materials. For example, in dressmaking and tailoring establishments it is often desirable to temporarily anchor a piece of cloth, either to another piece of cloth or in position on a worktable; similar instances commonly occurring in various industrial applications. Further, such fasteners are commonly utilized in the home to hang towels and the like, and for other similar uses. Numerous fasteners and holding devices have been heretofore designed for these purposes, including many that are objectionable because they are expensive and relatively complicated in structure.

The advantages of the present fastener are that it is relatively simple and economical in construction, and can be easily manipulated to insert and remove material. Further, it provides sufficient clamping force to hold the material for the desired purpose, and is constructed so as to not damage the material being held.

Moreover, the fastener of the present invention eliminates mechanical catches, snaps or other locking devices, and instead utilizes magnetic forces for providing a uniform clamping action. The only moving elements thereof are two hinged plates having a novel magnetic assembly associated therewith; hence, there are no complicated, difficult-to-manufacture elements involved. The magnetic assembly portions associated with the two plates cooperate to secure a piece of flexible material between said plates against a substantial pulling force, said plates being so constructed as not to cause damage to said material. Moreover, the fastener of the invention may be easily manipulated with one hand, and thus is especially useful in industrial and like applications where ease of operation and elimination of lost motion are desirable.

It is an object of this invention to provide a fastener for holding and/or hanging flexible materials, so constructed as to firmly hold said materials without causing damage thereto.

Another object is to provide a fastener employing a magnetic assembly to produce an effective clamping force over a relatively large area from a relatively small amount of magnetized material.

Yet another object is to provide a magnetic fastener employing securing pins therein, and so constructed as to positively hold a piece of material.

Other objects and many of the attendant advantages of the invention will be readily appreciated as the same become better understood by reference to the following detailed description when considered in connection with the accompanying drawings, wherein:

FIG. 1 is a plan view of one form of fastener in its closed position, with a piece of cloth held therein;

FIG. 2 is an end elevational view of the fastener of FIG. 1, showing in particular the manner in which the cloth is held by the fastener;

FIG. 3 is a view in front elevation of the fastener of FIG. 1, showing in particular the manner in which the serrated edges of the magnetic assembly grasp the fabric;

FIG. 4 is a perspective view of the fastener of FIG. 1 in its open position; and FIG. 5 is a perspective view, similar to FIG. 4, of a modified form of the invention including impaling pins.

The fastener of the invention may be utilized as a movable device for clamping fabric material, or it may be secured to a worktable, wall, or other structure of in-place use. In every instance, the fastener will function in an identical manner to secure cloth, plastic or other like material. Also, in all cases, it may be readily engaged and disengaged with one hand.

Referring now to the drawings, the fastener assembly is indicated generally at 2 in FIG. 1, a piece of cloth material 4 being shown clamped therein. The fastener 2 includes a rectangular upper plate 6 and a rectangular lower plate 8, both made of nonmagnetic metal. The upper plate 6 has a rectangular notch 10 medially along its rear edge. The portions of said plate on both sides of the notch 10 are bent into a tubular configuration to form a pair of aligned cylindrical collars 12. The lower plate 8 has a rectangular tongue projecting from the rear edge thereof which is bent into a tubular configuration to form a cylindrical collar 14, said collar being receivable within the space between the collars 12 and having a configuration identical to that of said collars 12. A hinge pin 16 is received within the aligned openings of the collars 12 and 14, and thus functions to hinge together the plates 6 and 8. The ends of the hinge pin 16 have heads 18 thereon for the purpose of securing said pin in position, the distance between said heads being slightly greater than the length of said plates 6 and 8 to provide a space at one end of said plates for the reception of a torsion spring 20.

The spring 20 is relatively weak, and includes a pair of arms 22 and 24. The end of the arm 22 has a projection 23 thereon which is anchored in a hole 23a, formed in the end of the lower plate 8, and the other arm 24 is similarly anchored to the upper plate 6 by a projection 25 anchored within a hole 25a formed in plate 6. The purpose of the relatively weak spring 20 is to hold the two plates 6 and 8 in their open position, in which position the plates generally are at right angles to each other, as shown in FIG. 4. In certain applications it may be desirable to eliminate the spring 20, in which case there is no mechanical element present to hold the plates in said open position.

The two plates 6 and 8 have identical lengths and widths, so that their peripheral edges coincide. The forward edges of said plates are disposed parallel to the axis of the hinge pin 16, and are spaced a substantial distance therefrom. The upper face of the lower plate 8 has fastened thereon adjacent and parallel to the front edge thereof a pair of normally projecting, spaced, parallel bars 26 and 28 of magnetic material, such as iron. Disposed between said bars at the opposite ends thereof is a permanent magnet 30, the poles of said magnets being so positioned that similar magnetic lines of flux will flow through the two bars 26 and 28 at either end thereof. The height of each magnet 30 is substantially less than the height of the bars 26 and 28, a height equal to half that of said bars being typical. As is best shown in FIGS. 3 and 4, the central portions of the two bars 26 and 28, inwardly of the magnets 30, curve downwardly in a generally arcuate manner, and have serrations 32 and 34, respectively, formed thereon.

The lower face of the upper plate 6 has a wedge bar 36 secured thereto, said wedge bar projecting downwardly normally from said plate and being disposed so as to be received within the trough defined by the bars 26 and 28. The length of the wedge bar 36 is slightly less than the distance between the magnets 30, and the lower edge thereof is curved arcuately downwardly and has serrations 38 thereon. The wedge bar 36 is constructed of a magnetic material such as is utilized for the bars 26 and 28. Secured to the lower face of said upper plate at each end of said wedge bar 36 is a rectangular piece of magnetic material 40, each of said pieces having a width corresponding to the distance between the outer sides of the bars 26 and 28, and a length corresponding to that of the magnets 30. The edges of said pieces 40, which confront the ends of the wedge bar 36, are notched, as at 41, medially thereof for receiving said ends, as is best shown in FIG. 4.

The height of the bars 26 and 28, and the thickness of the pieces 40, are so related to the diameter of the collars 12 and 14, that when said pieces are resting upon the upper edges of said bars, the plates 6 and 8 are disposed generally parallel, as shown in FIGS. 2 and 3. The wedge bar 36 has a height sufficiently great so that, when the pieces 40 are resting upon said upper edges of the bars 26 and 28, the downwardly curved serrated edge 38 thereof will extend below the serrated edges 32 and 34 of the bars 26 and 28, as is indicated by broken lines in FIG. 3; the width, or thickness, of the wedge bar 36 is substantially less than the distance between the parallel bars 26–28 so that a space exists for fabric between the sides of said wedge bar and the walls of the trough defined by the bars 26 and 28 (FIG. 2).

The plates 6 and 8 are constructed of a nonmagnetic material, such as brass or a suitable plastic. The magnets 30 are disposed so that the N-pole thereof is adjacent the bar 26 and the S-pole thereof is adjacent the bar 28, as indicated in FIG. 2. In operation, a piece of flexible sheet material, such as the cloth 4, is laid upon the bars 26 and 28. The upper plate 6 is then swung toward the lower plate 8, the wedge bar 36 engaging the material 4 and carrying it into the trough between the bars 26 and 28 as said plates approach their parallel, closed position (FIG. 2). As the two plates approach their closed position, the manetic field created by the respective magnets 30 within the bars 26 and 28 will attract the magnetic material of the wedge bar 36 and the pieces 40, and will tightly hold the latter elements in their closed position adjacent to said bars 26 and 28. The serrated edges on the three interengaged bars 26, 28 and 36 function to further insure that the material 4, which is already wedged in position by the wedge bar 36 as shown in FIG. 2, will be securely held.

When it is desired to release the material 4, a force sufficiently strong to separate the two halves of the magnetic assembly is manually applied to the upper plate 6, assuming the lower plate 8 is fastened to a support. Once the plates have been moved apart to the point where the wedge bar 36 is elevated a substantial distance above the parallel bars 26 and 28, the effect of the magnetic holding force is lessened to the point where the relatively weak spring 20 thereafter functions to maintain said plates in their open position until they are again closed to clamp a piece of material.

It will be readily seen from the foregoing that a fastener has been provided which will not damage fabric held thereby; which incorporates no moving mechanical grasping elements; and which is easy to construct and manipulate.

If it is desired to use the fasteners in a fixed position, one of the two plates 6 or 8 is merely secured by suitable fasteners to a table, wall, or other support structure (not shown). If neither plate 6 or 8 is fixed, then the cloth can be removed by manually grasping the plates and swinging them apart.

In cases where a positive locking effect is desired to hold slick materials, such as silk and some plastics, a second embodiment of the invention, such as is shown in FIG. 5, can be employed.

Referring to FIG. 5, a fastener 42 is shown which comprises an upper plate 44 and a lower plate 46, said plates respectively having interleaved collars 48 and 50 thereon connected by a hinge pin 52. The plates 44 and 46 are identical in construction to the plates 6 and 8, except that they are made of magnetic material. A spring 54 is provided to maintain said plates in an open position, said spring being mounted in a manner identical to the spring 20.

The lower plate 46 has secured thereto a pair of spaced, parallel bars 56 and 58, said bars projecting normally from said plate adjacent the forward edge thereof and having a length substantially less than the length of said plate. The upper edges of said bars are curved arcuately downwardly, and have serrations 60 and 62, respectively, thereon. A pair of magnets 64 is secured to the plate 46, one at each end of the bars 56 and 58. The magnets 64 are arranged on the plate 46, one with the N-pole at the top away from the plate and the other with the N-pole at the bottom and against the plate, as indicated. The width of each magnet is substantially identical to the distance between the outer sides of the bars 56 and 58, and the height thereof is identical to the height of said bars at the ends thereof. The bars 56 and 58, unlike the bars 26 and 28, are constructed of a non-magnetic material.

The upper plate 44 has secured thereto, to project normally therefrom, a wedge bar 66, which is identical in construction to the bar 36, except that it is made of a nonmagnetic material. The bar 66 is positioned to enter the trough between the bars 56 and 58 in a manner similar to that illustrated for the bar 36 in FIG. 2. Spaced from the ends of the bar 66 and in alignment therewith is a pair of sharply pointed, slender steel pins 68, said pins being secured to the plate 44 to project normally therefrom. The magnets 64 are provided with vertical bores 70 centrally thereof, said bores being of a size to readily receive the pins 68 when the plates 44 and 46 are in their closed, parallel position. Additional holding force will be produced if the pins 68 are made of magnetic material.

In operation, the fastener 42 of FIG. 5 functions in a manner similar to the fastener 2 of FIGS. 1–4. A piece of flexible material is placed upon the bars 56 and 58, and the upper plate 44 is then swung toward the lower plate 46. As the two plates approach their closed position, the magnets 64 exert a magnetic force upon the plates 44 and 46 sufficient to hold said plates in a closed position. Thus, a closed path for magnetic lines of force will be produced through one magnet 64, plate 46, the other magnet 64 and the other plate 44. The pins 68 will pierce the material overlying the magnets 64 as the fastener closes, and will then enter the bores 70. It is thus seen that the material will be held within the fastener both by the wedge bar 66 and by the pins 68, so that movement thereof away from the fastener is positively prevented. The pins 68, because they are very slender, will normally not create objectionable holes in the material being clamped.

The magnets 64, as was stated hereinabove, are of a height identical to that of the ends of the bars 56 and 58, and no magnetic pieces similar to the pieces 40 are shown to be employed on the upper magnetic plate 44. It is to be understood, however, that this construction could be altered, and that magnetic pieces similar to the pieces 40 in FIGS. 1–4 might be employed in the fastener 42 if desired, in which instance the pins 68 would project from the surface of such pieces of magnetic material. If magnetic pieces 40 are used, then the plates 44 and 46 can be nonmagnetic, and the magnetic flow will be similar to that in FIGS. 1 to 4.

It is thus seen that a fastener has been provided which readily fulfills the objectives hereinabove set forth for the invention, and which can be readily and economically manufactured. Further, it is obvious that the fastener can be made in various sizes, and that the arrangement of the magnets and the bars of magnetic material can be varied as desired to meet design requirements.

Obviously, many modifications and variations of the present invention are possible in the light of the above teachings. It is to be understood, therefore, that within the scope of the appended claims the invention may be constructed and designed otherwise than as specifically described.

What is claimed is:

1. A fastener for holding flexible sheet material, comprising: a pair of plates having aligned, apertured collars at one edge thereof and hinged together along said one edge by a pin extending through said apertures, said plates being arranged for movement between a confronting position and a position where in one of said plates is disposed at an angle to the other; a first means upon the confronting face of one of said plates for creating a magnetic field, said means including a pair of spaced, parallel bars of magnetic material secured to project normally from said plate and magnet means disposed between said spaced bars; and a second magnetic means on the confronting face of the other of said plates responsive to and positioned to confront said first means, said second means including a wedge bar of magnetic material secured to project normally from the confronting face of said other plate, said wedge bar being arranged to enter a space between said spaced bars when said plates are in their confronting position, both of said means cooperating when said plates are in said confronting position to secure said plates in said confronting position.

2. A fastener as recited in claim 1, wherein the confronting edges of said spaced bars and said wedge bar are serrated, and wherein said wedge bar has a width substantially less than the space between said pair of spaced bars.

3. A fastener for holding flexible sheet material, comprising: a pair of plates hinged together along one edge thereof, said plates being arranged for movement between a confronting position and a position wherein one of said plates is disposed at an angle to the other thereof; a pair of spaced, parallel bars of magnetic material secured to the confronting face of one of said plates and arranged to project normally therefrom; a pair of spaced magnets secured to said confronting face between said bars; and a wedge bar secured to the confronting face of the other plate and arranged to project normally therefrom, said wedge bar being constructed of magnetic material and being arranged to enter the space between said spaced bars when said plates are in said confronting position.

4. A fastener as recited in claim 3, including a piece of magnetic material secured to said other confronting face at either end of said wedge bar and arranged to seat upon said spaced bars when said plates are in their confronting position.

5. A fastener as recited in claim 3, wherein said wedge bar has a length corresponding substantially to the space between said magnets, and wherein the confronting edges of said wedge bar and said pair of spaced bars are serrated.

6. A fastener for holding flexible sheet material, comprising: a pair of plates hinged together along one edge thereof, said plates being arranged for movement between a confronting position and a position wherein one of said plates is disposed at an angle to the other; a pair of spaced, parallel bars secured to the confronting face of one of said plates and projecting normally therefrom, the other plate having magnetic means associated therewith; a wedge bar secured to the confronting face of the other plate and projecting normally therefrom, said wedge bar being arranged to enter the space between said spaced bars when said plates are in confronting position and to cooperate therewith to grip flexible sheet material therebetween; and a magnet secured to said one confronting face adjacent each end of said parallel bars for attracting said magnetic means to hold said plates in said confronting position.

7. A fastener as recited in claim 6, wherein the plates are made of magnetic material, and wherein the N-pole of one magnet and the S-pole of the other magnet are disposed against said one confronting face.

8. A fastener as recited in claim 6, wherein each of said magnets has a bore therein, and wherein a pair of pins is secured to the confronting face of said other plate to project normally therefrom, said pins being positioned to enter said bores when said plates are in said confronting position.

9. A fastener for holding flexible sheet material, comprising: a pair of plates made of magnetic material hinged together along one edge thereof, said plates being pivotally connected for movement between a confronting position wherein they are substantially parallel and a position wherein one of said plates is disposed at an angle to the other; a pair of spaced, parallel bars of nonmagnetic material secured to the confronting face of one of said plates and projecting normally therefrom; a nonmagnetic wedge bar secured to the confronting face of the other plate and projecting normally therefrom, said wedge bar being arranged to enter the space between said spaced bars when said plates are in confronting position and to cooperate therewith to grip flexible sheet material therebetween; and a magnet secured to said one confronting face adjacent each end of said parallel bars for holding said plates in said confronting position, the N-pole of one magnet and the S-pole of the other magnet being disposed against said one confronting face.

10. A fastener as recited in claim 6, wherein the confronting edges of said spaced bars and said wedge bar are serrated, and wherein said wedge bar has a width substantially less than the space between said pair of spaced bars.

11. A fastener for holding flexible sheet material, comprising: a pair of plates having aligned apertured collars at one edge thereof, and hinged together along said one edge by a pin extending through said apertures, said plates being arranged for movement between a confronting position, wherein they are in spaced, generally parallel, relationship, and a position wherein one of said plates is disposed at an angle to the other; a pair of spaced, parallel bars secured to the confronting face of one of said plates and projecting normally therefrom; a magnetic wedge bar secured to the confronting face of the other plate and projecting normally therefrom, said wedge bar being arranged to enter the space between said spaced bars when said plates are in confronting position, and to cooperate therewith to grip flexible sheet material therebetween; and magnet means secured to one of said confronting faces at the opposite ends of said parallel bars for holding said plates in said confronting position.

12. A fastener for holding flexible sheet material, comprising: a pair of plates hinged together on one edge thereof, said plates being arranged for movement between a confronting position and a position wherein one of said plates is disposed at an angle to the other; a pair of spaced, parallel bars secured to the confronting face of one of said plates and projecting normally therefrom; a wedge bar secured to the confronting face of the other plate and projecting normally therefrom, said wedge bar being arranged to enter the space between said spaced bars when said plates are in confronting position and to cooperate therewith to grip flexible sheet material therebetween, said parallel bars and said wedge bar being made of magnetic material; and magnet means secured to one end of said confronting faces in the region of said parallel bars and said wedge bar for holding said plates in said confronting position, said magnet means comprising magnets secured to said one confronting face, and positioned to engage the opposite ends of said spaced, parallel bars.

13. A fastener for holding flexible sheet material, comprising: a pair of plates hinged together along one edge thereof, said plates being arranged for movement between a confronting position and a position wherein one of said plates is disposed at an angle to the other, said plates being made of a magnetic material; a pair of spaced, parallel bars secured to the confronting face of one of said plates and projecting normally therefrom; a wedge bar secured to the confronting face of the other plate and projecting normally therefrom, said wedge bar being arranged to enter the space between said spaced bars when said plates are in confronting position and to cooperate therewith to grip flexible sheet material therebetween; and magnet means secured to one end of said confronting faces in the region of said parallel bars and said wedge bar for holding said plates in said confronting position, said magnet means comprising magnets secured to one of said confronting faces and positioned to be engageable with the other confronting face.

References Cited by the Examiner

UNITED STATES PATENTS

| | | | |
|---|---|---|---|
| 1,173,282 | 2/16 | Leary | 229—6 |
| 2,497,266 | 2/50 | Levane | 16—189 |
| 2,862,752 | 12/58 | Heppner | 292—251.5 |
| 2,964,275 | 12/60 | Atkinson | 248—95 |

FOREIGN PATENTS 143,816  12/35  Austria.

OTHER REFERENCES

German printed application 1,088,074, September 1960.

DONLEY J. STOCKING, *Primary Examiner.*